United States Patent
Fujii

[19]
[11] Patent Number: 5,944,910
[45] Date of Patent: Aug. 31, 1999

[54] METHOD OF WASHING A GLASS SURFACE OF A VEHICLE

[76] Inventor: Mitsuo Fujii, 17-6 Higashi-Koiwa 4-chome, Edogawa-ku, Tokyo, Japan

[21] Appl. No.: 09/115,882

[22] Filed: Jul. 15, 1998

Related U.S. Application Data

[62] Division of application No. 08/699,428, Aug. 19, 1996, Pat. No. 5,819,360.

[30] Foreign Application Priority Data

Sep. 19, 1995 [JP] Japan ................................. 7-240244
May 13, 1996 [JP] Japan ................................. 8-118061

[51] Int. Cl.$^6$ ............................. B08B 7/00; B60S 1/46; B60S 1/48
[52] U.S. Cl. ........................... 134/6; 134/42; 15/250.01; 15/250.03; 15/250.04; 239/284.1; 239/284.2
[58] Field of Search ................. 134/6, 42; 15/250.01, 15/250.03, 250.04; 239/284.1, 284.2

[56] References Cited

U.S. PATENT DOCUMENTS

| | | | |
|---|---|---|---|
| 3,760,451 | 9/1973 | Steed | 15/250.02 |
| 3,854,161 | 12/1974 | Benson | 15/250.04 |
| 4,393,341 | 7/1983 | Byrne | 318/443 |
| 4,811,451 | 3/1989 | Roller | 15/250.04 |
| 4,920,602 | 5/1990 | Kuehbauch | 15/250.04 |
| 4,922,570 | 5/1990 | Hirohama et al. | 15/250.02 |
| 5,203,049 | 4/1993 | Nogawa | 15/250.02 |

FOREIGN PATENT DOCUMENTS

| | | | |
|---|---|---|---|
| 2216752 | 10/1973 | Germany | 15/250.04 |
| 2227583 | 1/1974 | Germany | 15/250.2 |
| 2344724 | 3/1975 | Germany | 15/250.04 |
| 2412583 | 9/1975 | Germany . | |
| 2425864 | 12/1975 | Germany . | |
| 4238 | 1/1980 | Japan . | |
| 1493597 | 11/1977 | United Kingdom | 15/250.04 |

*Primary Examiner*—Zeinab El-Arini
*Attorney, Agent, or Firm*—Jordan and Hamburg LLP

[57] ABSTRACT

A method of washing a glass surface, such as, for example, a windshield or other vehicle window includes adjusting emission of a washing liquid relative to a wiper stroke cycle. The washing liquid is emitted from a plurality of positions arranged on a swinging wiper in a direction towards a forward-wiping side thereof, along the longitudinal direction of a blade rubber of the wiper. During a wiper stroke cycle, the washing liquid is emitted at least over a range of wiper travel extending from a forward swing starting point to a predetermined intermediate point located before a turning point of the stroke cycle where the forward swing ends and a backward return swing is commenced. In a further embodiment, a rate at which the washing liquid is emitted at the various emission points along the length of the blade rubber increases with an increase in the distance of a particular emission point as measured from the center of swinging rotation of the wiper.

6 Claims, 14 Drawing Sheets

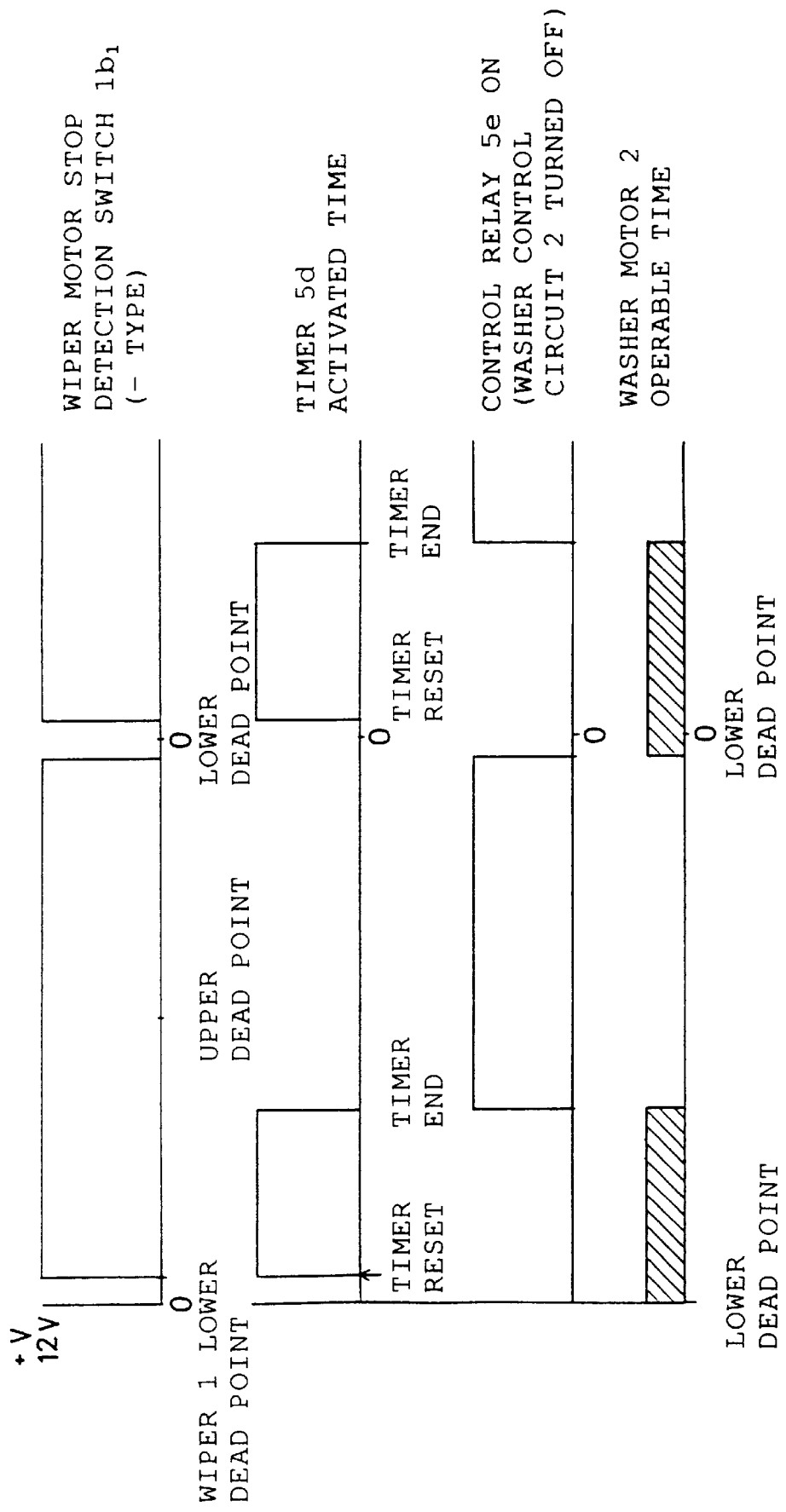

METHOD OF WASHING A GLASS SURFACE OF A VEHICLE

This is a division, of application Ser. No. 08/699,428, filed Aug. 19, 1996 now U.S. Pat. No. 5,819,360.

BACKGROUND OF THE INVENTION

The present invention relates to a wiper-cooperative washing apparatus used for washing a glass surface of a vehicle, and particularly to a wiper-cooperative washing method capable of adequately adjusting an emission rate of a washing liquid and an emission timing to thereby prevent waste of the washing liquid, and to an apparatus used directly for embodying the method.

In a conventional wiper-cooperative washing apparatus for washing a windshield surface of an automobile or the like, a washer nozzle for emitting a washing liquid toward the windshield surface is provided, on a hood or the like, separately from a wiper. Since the washer nozzle is far apart from the windshield, a crosswind or a headwind causes a problem that washing liquid fails to hit the windshield and scatters, resulting in waste of the washing liquid and dirtying a body of the vehicle itself.

Also, there is a problem that when the windshield surface is washed while the vehicle is stopped, the washing liquid splashes a car or motorcycle, parked or temporarily stopped alongside, or a person walking by or standing alongside, thereby contaminating the vehicle or displeasing the person.

Further, in a wiper-cooperative washing apparatus of this kind, when the body of an automobile is waxed, a washer nozzle may become clogged with wax and consequently may become unusable. To avoid this clogging problem, the diameter of a hole in the washer nozzle must be increased. Additionally, when a washing liquid is emitted while a vehicle is traveling, an excessively intensive emission of the washing liquid causes traces of the emitted liquid and an ununiform liquid film to remain on the windshield surface and to block a driver's view until a wiper blade swings a plurality of times to wipe them off. This endangers traffic safety.

Thus, in recent years, there has been provided a wiper-cooperative washing apparatus for a vehicle in which a washer nozzle is mounted on a wiper with the nozzle and the wiper constituting a single unit, as disclosed in Japanese Patent Laid-Open No. 5-8705 or No. 5-97017.

In a conventional wiper-cooperative washing apparatus for a vehicle in which a washer nozzle is mounted on a wiper in a single unit, the washing liquid tends to be over-emitted in order to avoid insufficient or disabled washing or to avoid scratching a glass surface or wearing a wiper blade at a quicker rate due to insufficient supply of a washing liquid. Since an emission rate of the washing liquid is not properly adjusted, a large amount of the washing liquid flows down the glass surface of the vehicle, and a blade rubber fails to completely wipe off the washing liquid. As a result, the washing liquid remains in streaks or stripes on the glass surface and thus deteriorates a driver's view.

To solve this problem, a driver must run only a wiper to wipe off the remaining washing liquid.

Further, in a conventional wiper-cooperative washing apparatus, a washing liquid is not uniformly applied onto a surface to be wiped, resulting in a spotted surface.

In view of the foregoing problems involved in such a wiper-cooperative washing apparatus, the inventor of the present invention carried out trial and error experiments over long years, and as a result, achieved the present invention.

SUMMARY OF THE INVENTION

Major objects of the present invention are as follows.

A first object of the present invention is to provide a wiper-cooperative washing method and apparatus capable of adequately adjusting an emission rate and timing of a washing liquid, thereby preventing waste of the washing liquid.

A second object of the present invention is to provide a wiper-cooperative washing method and apparatus capable of sufficiently wiping off a washing liquid through reduced operation of a wiper blade, thereby securing a driver's view to ensure safety in driving.

A third object of the present invention is to provide a wiper-cooperative washing method and apparatus which uniformly applies a washing liquid to a glass surface to be wiped so as to wash the surface without leaving spots thereon and whose washing operation does not have an adverse effect on the surrounding environment.

A fourth object of the present invention is to provide a wiper-cooperative washing method and apparatus capable of adequately washing a glass surface of a vehicle while it is parked or being driven.

A fifth object of the present invention is to provide a wiper-cooperative washing method and apparatus having a mechanism for preventing a washing liquid from oozing through a nozzle opening after the washing liquid emission stops.

Other objects of the present invention will be understood from the specification, drawings, and particularly from the descriptions of claims.

The present invention achieves the above-described objects by employing new structural features described below.

That is, according to a first feature of a wiper-cooperative washing method of the present invention, a washing liquid is emitted toward a forward-wiping side from a plurality of positions arranged on a swinging wiper, along the longitudinal direction of a blade rubber of the wiper, such that the washing liquid is emitted or sprayed at least over a range extending from a forward swing starting point to a predetermined intermediate point located before a turning point where the forward swing ends, and such that a uniform washing liquid film is formed on a glass surface of a vehicle so as to not deteriorate a driver's view.

According to a second feature of a wiper-cooperative washing method of the present invention, the predetermined intermediate point associated with the first feature of the method corresponds to 55% to 75% the distance of one forward swing stroke as measured from the forward swing starting point.

According to a third feature of a wiper-cooperative washing method of the present invention, the emission of the washing liquid associated with the first feature of the method starts at the same time as or at a predetermined time before the wiper starts to swing forward.

According to a fourth feature of a wiper-cooperative washing method of the present invention, the plurality of positions along the longitudinal direction of the blade rubber associated with the first feature of the method correspond to at least both ends of the blade rubber.

According to a fifth feature of a wiper-cooperative washing method of the present invention, the emission of the washing liquid associated with the first feature of the method is adjusted such that an emission rate increases with the distance of an emission position along the longitudinal direction of the blade rubber as measured from the center of swinging rotation of the wiper increases.

According to a first feature of a wiper-cooperative washing apparatus of the present invention, the apparatus for washing a glass surface of a vehicle comprises a wiper blade nozzle pipe having a plurality of nozzle openings for emitting a washing liquid toward the forward-wiping side of a blade rubber of a wiper of a wiper blade assembly; a washer pump; a pipe for feeding the washing liquid from the washer pump to the nozzle openings; control means for controlling operation of the wiper and the washer pump; and a washer switch. The wiper blade nozzle pipe contains therein a ball for reducing and adjusting an emission rate of each of the left-hand and right-hand endmost nozzles attached to the wiper blade nozzle pipe at both ends thereof. The control means causes an arm of the wiper to swing a predetermined number of times when the washer switch is switched on, and during every forward swing of the arm keeps the washer pump operating until 55% to 75% of one forward wiping stroke is completed. The emission timing of the washing liquid is thus adjustable.

According to a second feature of a wiper-cooperative washing apparatus of the present invention, the apparatus comprises a wiper blade nozzle pipe having a plurality of nozzle openings for emission a washing liquid toward the forward-wiping side of a blade rubber of a wiper of a wiper blade assembly; a washer pump; and control means for controlling operation of the wiper and the washer pump. When the washer switch is switched on, an arm of the wiper is swung a predetermined number of times, and during every forward swing of the arm the washer pump is operated while the shaft of the arm rotates from a starting position to an angle of rotation of 50° to 70°, thereby adjusting the emission timing of the washing liquid.

According to a third feature of a wiper-cooperative washing apparatus of the present invention, the apparatus for washing a glass surface of a vehicle comprises a wiper blade to which is attached, in a single unit, to an attachment nozzle pipe having a plurality of nozzle openings for emitting a washing liquid toward the forward-wiping side of a blade rubber of a wiper to form a wiper blade assembly; a washer pump; a pipe for feeding the washing liquid from the washer pump to the nozzle openings; control means for controlling operation of the wiper and the washer pump; and a washer switch. The wiper blade nozzle pipe contains a ball for reducing and adjusting an emission rate of each of the left-hand and right-hand endmost nozzles attached to the wiper blade nozzle pipe at both ends thereof. The control means causes an arm of the wiper to swing a predetermined number of times when the washer switch is switched on, and during every forward swing of the arm keeps the washer pump operating until 55% to 75% of one forward wiping stroke is completed. The emission timing of the washing liquid is thus adjustable.

According to a fourth feature of a wiper-cooperative washing apparatus of the present invention, the apparatus for washing a glass surface of a vehicle comprises a wiper blade to which is attached, in a single unit, to an attachment nozzle pipe having a plurality of nozzle openings for emitting a washing liquid toward the forward-wiping side of a blade rubber of a wiper to form a wiper blade assembly; a washer pump; a pipe for feeding the washing liquid from the washer pump to the nozzle openings; control means for controlling operation of the wiper and the washer pump; and a washer switch. The attachment nozzle pipe, provided with left-hand and right-hand endmost nozzles, contains a ball for reducing and adjusting an emission rate of each of the left-hand and right-hand endmost nozzles. When the washer switch is switched on, the control means causes an arm of the wiper to swing a predetermined number of times, and during every forward swing of the arm keeps the washer pump operating while the axis of the arm rotates from a starting position to an angle of rotation of 50° to 70° thereby adjusting the emission timing of the washing liquid.

According to a fifth feature of a wiper-cooperative washing apparatus of the present invention, the control means associated with the first, second, third or fourth feature of the apparatus comprises a timer apparatus for adjusting timing of operation of both the wiper and the washer pump.

According to a sixth feature of a wiper-cooperative washing apparatus of the present invention, the control means associated with the first, second, third or fourth feature of the apparatus comprises a cam which rotates in a manner linked directly or indirectly with a rotary shaft of the wiper motor, as well as a cam switch for changing over operation of the washer pump through contact with the cam.

According to a seventh feature of a wiper-cooperative washing apparatus of the present invention, the control means associated with the first, second, third or fourth feature of the apparatus comprises a switch integrated with the wiper motor and having a brush which rotates together with the rotary shaft of the wiper motor, as well as a metal plate for changing over operation of the washer pump through contact with the brush.

According to an eighth feature of a wiper-cooperative washing apparatus of the present invention, the left-hand and right-hand endmost nozzles associated with the first, second, third or fourth feature each have a structure such that a nozzle opening is formed in a beak projecting perpendicularly from the nozzle pipe so as to emit the washing liquid along the longitudinal direction of the wiper blade.

According to a ninth feature of a wiper-cooperative washing apparatus of the present invention, the ball associated with the first, second, third or fourth feature is made of stainless steel and is contained in the wiper blade nozzle pipe or the attachment nozzle pipe in a manner such that the ball is freely movable along the axial direction of the pipe and such that the washing liquid is emitted in a greater quantity from a nozzle opening located farther from the rotary shaft of the wiper and in a lesser quantity from a nozzle opening located closer.

According to a tenth feature of a wiper-cooperative washing apparatus of the present invention, the left-hand and right-hand endmost nozzles associated with the first, second, third or fourth feature each have a slit ball-seat provided at an inner end portion thereof.

According to an eleventh feature of a wiper-cooperative washing apparatus of the present invention, the wiper blade nozzle pipe or the attachment nozzle pipe associated with the first, second, third or fourth feature includes internally provided check orifices, which are located at positions offset from both ends of the pipe toward a central portion thereof and which are blocked by the balls when the supply of the washing liquid stops suddenly.

According to a twelfth feature of a wiper-cooperative washing apparatus of the present invention, the wiper blade nozzle pipe or the attachment nozzle pipe associated with the first, second, third or fourth feature includes internally provided check valves, which are symmetrically located at locations offset from both ends of the pipe toward the central portion thereof, and in addition, in the left-hand and right-hand intermediate portions of the pipe, and which, due to a supply pressure of the washing liquid, open against a spring force upon supply of the washing liquid, and which, due to a spring force, close upon stop of supply of the washing liquid.

According to a thirteenth feature of a wiper-cooperative washing apparatus of the present invention, the left-hand and right-hand endmost nozzles associated with the first, second, third or fourth feature each have a beak projecting perpendicularly therefrom, with each beak having a nozzle opening located at the tip of the beak so as to emit the washing liquid perpendicularly to the longitudinal direction of the wiper blade, as well as having two nozzle openings arranged in two levels on the side wall of the beak so as to emit the washing liquid in the longitudinal direction of the wiper blade.

According to a fourteenth feature of a wiper-cooperative washing apparatus of the present invention, each of the left-hand and right-hand endmost nozzles associated with the first, second, third or fourth feature has a head formed at the end portion thereof located within the wiper blade nozzle pipe or the attachment nozzle pipe such that a circumferential clearance is formed between the inner surface of the pipe and the outer surface of the head, and the head has a ball seat which is formed at its end surface, and a small hole which is formed on the outer surface of the head and has a diameter smaller than that of a nozzle bore of the nozzles.

According to a fifteenth feature of a wiper-cooperative washing apparatus of the present invention, each of the check valves associated with the twelfth feature comprises a ball valve, a valve seat where the ball rests to block a valve bore, a compression coil spring for backing up the ball, and a support tube for supporting the compression coil spring.

According to a sixteenth feature of a wiper-cooperative washing apparatus of the present invention, the wiper blade nozzle pipe or the attachment nozzle pipe associated with the fifteenth feature has intermediate beaks, one of which is provided between the two left-hand check valves, and the other of which is provided between the two right-hand check valves. The intermediate beaks are oriented perpendicular to the pipe and in parallel with the left-hand and right-hand endmost nozzles.

According to a seventeenth feature of a wiper-cooperative washing apparatus of the present invention, each of the intermediate beaks associated with the sixteenth feature has one nozzle opening or two nozzle openings formed at the tip thereof. The two openings are formed in a forked manner.

According to an eighteenth feature of a wiper-cooperative washing apparatus of the present invention, the timer apparatus associated with the fifth feature comprises the following interrelated elements: a washer control circuit which outputs a start signal to a washer motor upon reception of an ON signal from a washer switch which turns ON/OFF in a manner interlocking with a wiper motor; a detection polarity changeover circuit by which a control polarity is manually selected beforehand so as to correspond to that of the washer motor; a washer switch signal detection circuit which detects the ON signal from the washer switch via the detection polarity changeover circuit; a timer setting time selection circuit which begins to clock a previously selected period of time upon reception of a detection signal from the washer switch signal detection circuit while a wiper motor stop signal, described later, is input; a wiper motor detection polarity changeover circuit by which a control polarity is manually selected beforehand so as to correspond to that of the wiper motor; a wiper motor stop detection circuit which detects the wiper motor stop signal via the wiper motor detection polarity changeover circuit and outputs the detected stop signal to the timer setting time selection circuit; a wiper motor run detection circuit which monitors the operation of the wiper motor via the wiper motor detection polarity changeover circuit; and a relay control circuit which outputs a washer motor stop signal to the washer control circuit upon reception of a relay ON signal from the timer setting time selection circuit after the elapse of the period of time set by the timer setting time selection circuit while a run signal is input from the wiper motor run detection circuit.

According to a nineteenth feature of a wiper-cooperative washing apparatus of the present invention, the wiper motor stop detection circuit and the wiper motor run detection circuit associated with the eighteenth feature all replaced with one wiper motor stop/run detection circuit when both stop and run of the wiper motor all detected using one detection switch.

According to a twentieth feature of a wiper-cooperative washing apparatus of the present invention, the wiper blade nozzle pipe or the attachment nozzle pipe associated with the first, second, third or fourth feature is made of a heat insulating synthetic resin.

According to a twenty-first feature of a wiper-cooperative washing apparatus of the present invention, a check valve against back flow is provided in a pipe that feeds the washing liquid to the wiper blade from the washer pump associated with the first, second, third or fourth feature.

According to a twenty-second feature of a wiper-cooperative washing apparatus of the present invention, the slit associated with the tenth feature is one radial slit, a plurality of slits equally spaced and arranged along the circumference of the ball seat, one diametrical slit, two crossed slits, or a plurality of radial slits.

According to a twenty-third feature of a wiper-cooperative washing apparatus of the present invention, the attachment nozzle pipe associated with the third or fourth feature is removably attached to the wiper blade by appropriate means such as screws, nuts and bolts, or INSULOCK bands; or is integrally attached to the wiper blade by appropriate bonding means such as an instantaneous bond.

According to a twenty-fourth feature of a wiper-cooperative washing apparatus of the present invention, the glass surface of a vehicle associated with the first, second, third or fourth feature is a front windshield surface, a side windshield surface, or a rear windshield surface.

The present invention is embodied in the following mode. A wiper-cooperative washing apparatus according to the present invention is directly incorporated into a vehicle of a new model or is mounted as an attachment to an existing vehicle.

In the present specification, the forward-wiping side of a blade rubber denotes the side first engaging the glass surface of a vehicle which is to be wiped by the blade rubber while the blade rubber swings forward.

When the glass surface of a vehicle is washed using a wiper-cooperative washing method and apparatus according to the present invention, a wiper blade is swung back and forth, for example, once, twice, or 3 times.

Control means operates a washer pump so as to keep emitting a washing liquid from a nozzle opening in a wiper blade nozzle or an attachment nozzle pipe until, for example, 50% to 70% of one forward wiping stroke is completed while the wiper blade is swinging back and forth.

Thus, the glass surface of a vehicle can be washed using a required minimum amount of the washing liquid during every forward swing of the wiper blade, and the washing liquid remaining on the glass surface can be wiped off almost completely during the subsequent backward swing of the wiper blade. As a result, since no washing liquid remains on the glass surface, a driver's view is not deteriorated during washing, and washing can be completed within a short time.

A plurality of nozzle openings for emitting the washing liquid are provided along the longitudinal direction of the wiper blade nozzle pipe or the attachment nozzle pipe. In this case, a stainless ball is contained in the pipe so that the washing liquid is emitted in a greater quantity from a nozzle opening located farther from the rotary shaft of the wiper and in a lesser quantity from a nozzle opening located closer. Thus, the washing liquid is uniformly applied to the glass surface of a vehicle to be wiped, thereby washing the glass surface without leaving any spots thereon.

Other features and advantages of the invention will be apparent from the following description taken in connection with the accompanying drawing.

BRIEF DESCRIPTION OF THE DRAWINGS

FIG. 15 is a timing chart illustrating circuit operations in the third example.

DETAILED DESCRIPTION OF THE INVENTION

The present invention will be described in detail by way of example with reference to accompanying drawings.

Figure 1:
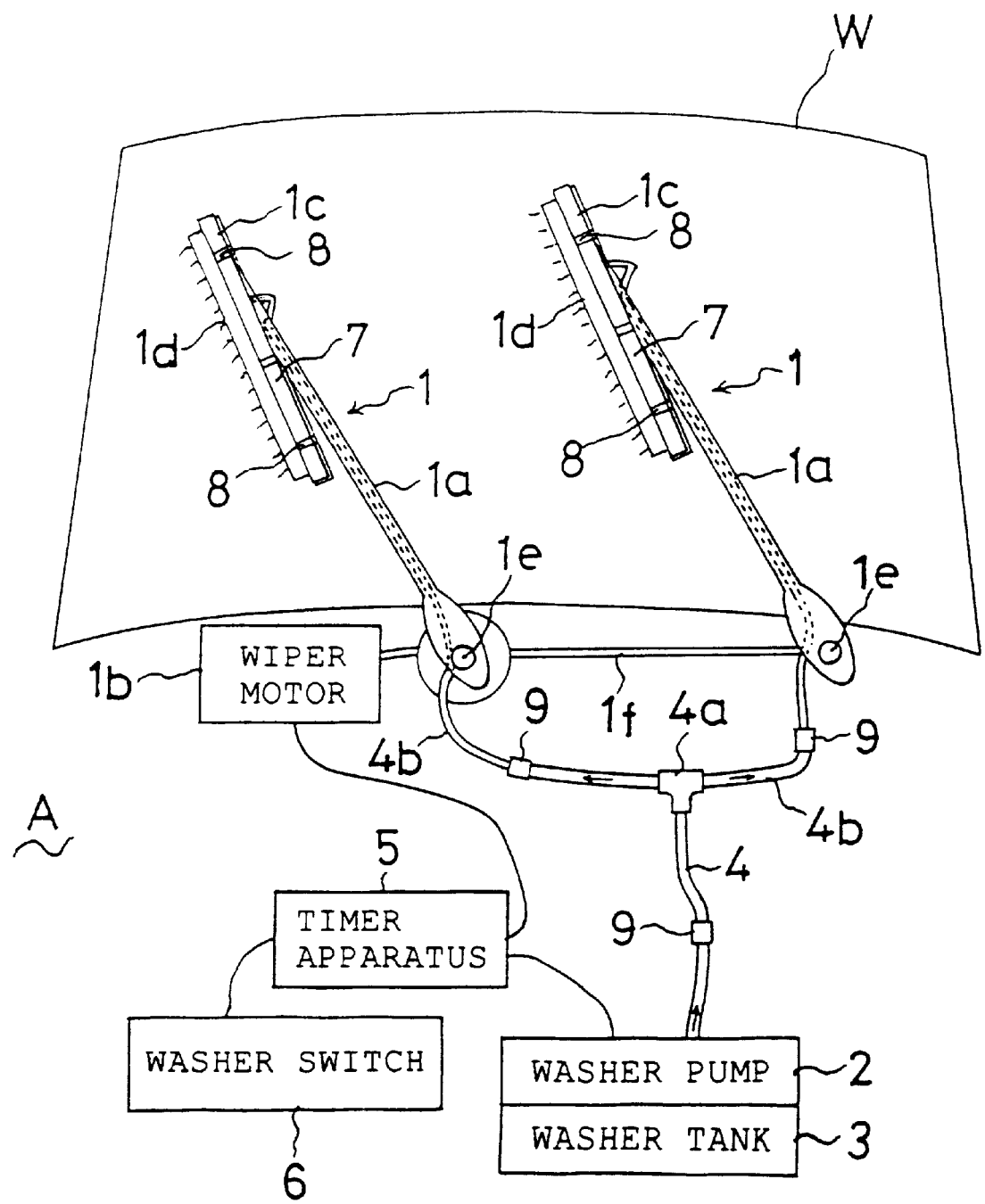
FIG. 1 is a explanatory view showing the main structure of a wiper-cooperative washing apparatus according to a first example of the present invention.
Figure 2:
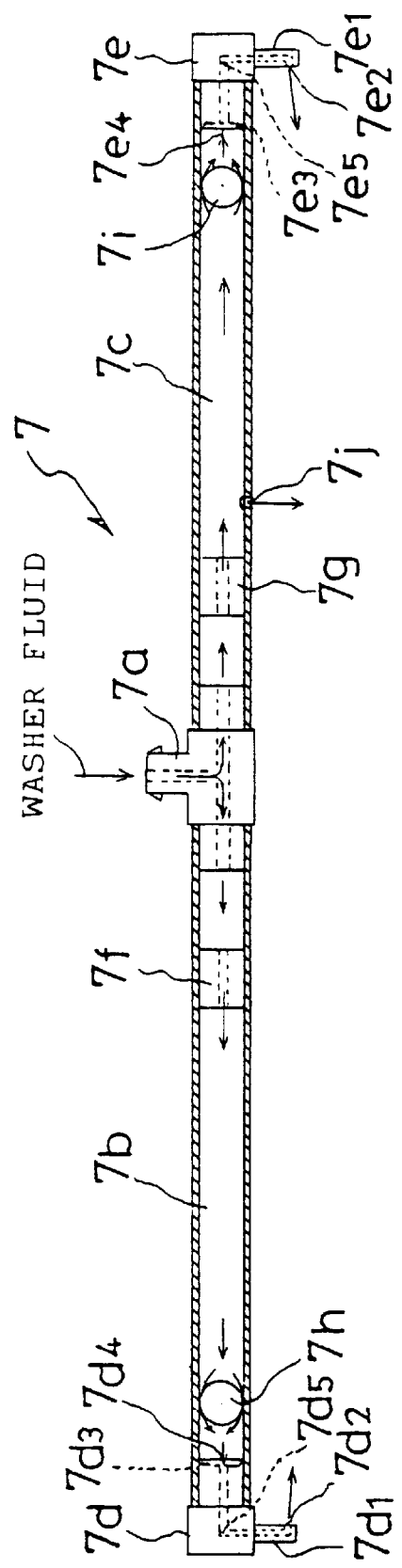
FIG. 2 is a partially cut away front view showing an attachment nozzle pipe used in the first example.
Figure 3:
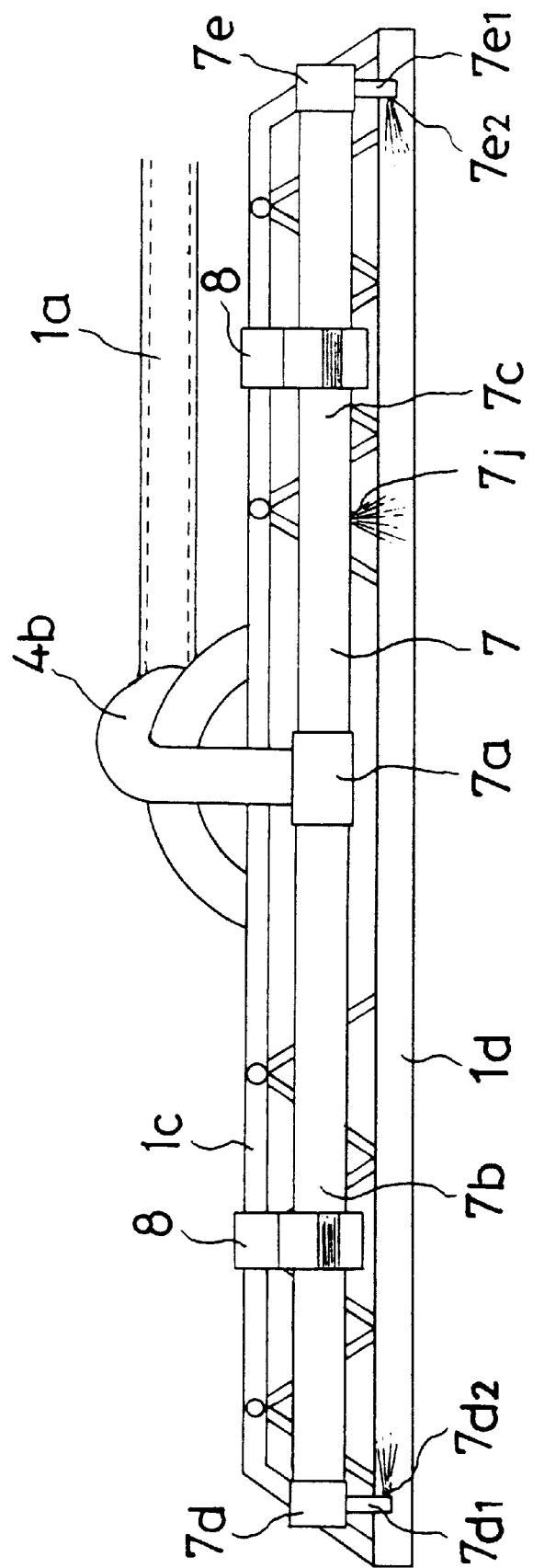
FIG. 3 is a schematic view showing attachment of the attachment nozzle pipe to a wiper blade.
Figure 4:
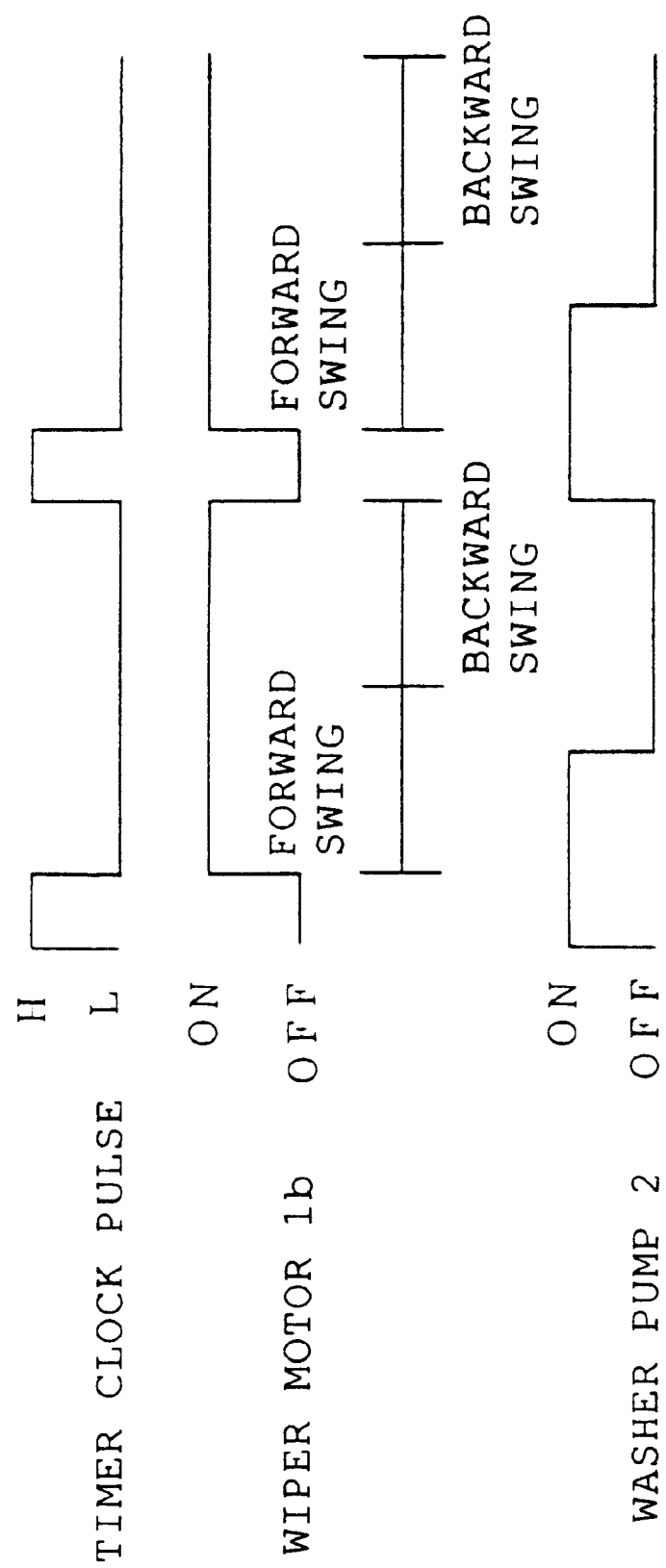
FIG. 4 is a timing chart illustrating an operation sequence of a wiper motor and a washer pump which are controlled by a timer apparatus.

FIG. 1 shows the main structure of a wiper-cooperative washing apparatus A according to a first example of the present invention. FIG. 2 shows a partially cut away view of an attachment nozzle pipe in the first example. FIG. 3 shows a state in which the attachment nozzle pipe is removably attached to a wiper blade in the first example. FIG. 4 shows a timing chart illustrating the operations of a wiper motor and a washer pump controlled by a timer in the first example.

The wiper-cooperative washing apparatus A according to the present example comprises primarily a wiper 1, an arm 1a, a wiper motor 1b, a wiper blade 1c, a blade rubber 1d, a rotary shaft 1e, a link shaft 1f, a washer pump 2, a washer tank 3, a 3-way pipe 4, a 3-way joint pipe 4a, a timer apparatus 5, and a washer switch 6.

As the rotary shaft 1e makes one rotation, an unillustrated existing mechanism causes the arm 1a to swing forward and backward once.

As shown in FIG. 3, an attachment nozzle pipe 7 made of a heat insulating synthetic resin is removably attached to the wiper blade 1c of a wiper blade assembly on the forward-wiping side of the wiper blade 1c using adequate attaching means 8 such as an INSULOCK band.

When screws or nuts and bolts are used as the attaching means, the attachment nozzle pipe 7 allows an unillustrated mounting rib to extend along the upper edge of the pipe 7. The mounting rib is attached or hooked onto the wiper blade 1c.

The attachment nozzle pipe 7 is composed of the following elements: a central T-shaped 3-way joint pipe 7a; left-hand and right-hand wing pipes 7b and 7c extending from left-hand and right-hand ends, respectively, of the 3-way joint pipe 7a; left-hand and right-hand endmost nozzles 7d and 7e attached, respectively, to the left-hand and right-hand ends of the left-hand and right-hand wing pipes 7b and 7c, respectively, the nozzles 7d and 7e being made of, for example, a heat insulating engineering plastic; left-hand and right-hand check orifices 7f and 7g provided within the left-hand and right-hand wing pipes 7b and 7c, respectively, such that they are situated at locations near the corresponding base ends of the left-hand and right-hand wing pipes 7b and 7c; left-hand and right-hand stainless steel balls 7h and 7i which are contained within the left-hand and right-hand wing pipes 7b and 7c, respectively, in a manner movable along the axial direction of the pipes 7b and 7c and which have a diameter somewhat smaller than the inner diameter of the pipes 7b and 7c; and a nozzle opening 7j formed in the right-hand wing pipe 7c at an intermediate position.

An instantaneous bond may be used as the appropriate attaching means 8 for fixed attachment.

Each branch pipe 4b of the 3-way pipe 4 is run along and behind the wiper arm 1a, and an end of the branch pipe 4b is connected to a remaining upper end opening of the 3-way joint pipe 7a. The 3-way pipe 4 is flexibly formed and used to feed a washing liquid from the washer pump 2 to the attachment nozzle pipe 7. A check valve 9 against back flow is installed in each branch pipe 4b of the 3-way pipe 4 at an intermediate position.

The left-hand and right-hand endmost nozzles 7d and 7e have beaks 7d1 and 7e1, respectively. The beaks 7d1 and 7e1 are located perpendicularly to as well as at or near both ends of the blade rubber 1d. The beaks 7d1 and 7e1 have nozzle openings 7d2 and 7e2, respectively, so as to jet or emit the washing liquid along the longitudinal direction of the blade rubber 1d. Ball seats 7d4 and 7e4 having slits 7d3 and 7e3, respectively, are provided at the interior end of the left-hand and right-hand endmost nozzles 7d and 7e, respectively. The slits 7d3 and 7e3 may be one radial slit, a plurality of slits equally spaced and arranged along the circumference of the ball seats 7d4 and 7e4, one diametrical slit, two crossed slits, or a plurality of radial slits.

The stainless steel balls 7h and 7i are contained in the left-hand and right-hand wing pipes 7b and 7c, respectively. The arrangement of the balls 7h and 7i is adjusted such that the washing liquid is emitted at a greater rate from a nozzle opening located farther from the rotary shaft 1e of the wiper 1, i.e. the washing liquid is emitted in greater to lesser quantity from the nozzle openings 7d2, 7j and 7e2 in this order. As a result, the washing liquid is uniformly applied to glass surface W of a vehicle to be wiped, thereby washing the glass surface W without leaving any spots thereon.

A description will be given of the steps of an example of the method according to the present invention applied to the above-described example of the apparatus of the present invention.

FIG. 4 is a flowchart illustrating the operation sequence of the present method.

When the washing liquid is emitted, the balls 7h and 7i are pushed, as shown by arrows of FIG. 2, by the washing liquid whose supply pressure is increased by the left-hand and right-hand check orifices 7f and 7g. The balls 7h and 7i are then respectively pressed against the ball seats 7d4 and 7e4 having slits 7d3 and 7e3, respectively, of the left-hand and right-hand endmost nozzles 7d and 7e, respectively. During the jetting, i.E. emission, of the washing liquid, the left-hand endmost nozzle 7d of the wiper blade 1c gradually swings up from its starting position. Even though the balls 7h and 7i are pressed against the ball seats 7d4 and 7e4, respectively, the washing liquid is emitted in reduced quantity through the slits 7d3 and 7e3, right-angled nozzle bores 7d5 and 7e5, and then the nozzle openings 7d2 and 7e2.

At that time, the pressure of pressing the ball 7h against the ball seat 7d4 is relaxed due to gravity acting against the washing liquid pressure. On the other hand, the pressure of pressing the ball 7i against the ball seat 7e4 becomes very strong due to the addition of gravity to the washing liquid pressure. As a result, the washing liquid is emitted at a maximum rate from the nozzle opening 7d2, at a minimum rate from the nozzle opening 7e2, and at an intermediate rate from the nozzle opening 7j.

When the washer pump 2 is stopped to quickly stop feeding the washing liquid at the time when the arm 1a completes 55% to 75% of one forward wiping stroke, the pressure of pressing the balls 7h and 7i against the ball seats 7d4 and 7e4, respectively, is canceled, and the pressure difference between both ends of each of the left-hand and right-hand check orifices 7f and 7g is inverted. As a result, the balls 7h and 7i are attracted toward and pressed against the left-hand and right-hand check orifices 7f and 7g, thereby preventing the washing liquid from flowing backward as well as flowing forward. Because of gravity acting on the ball 7h, the ball 7h is attracted by a stronger force than the ball 7i and thus blocks the left-hand check orifice 7f more quickly. Consequently, the washing liquid is completely shut off at the nozzle openings 7d2, 7e2 and 7j, thereby preventing the washing liquid from oozing therefrom after the washer pump 2 is stopped.

The timer apparatus 5, when the washer switch 6 is turned on, switches the wiper motor 1b such that the arm 1a of the wiper blade 1c swings forward and backward, for example, twice, and also switches the washer pump 2 at such timing that emission of the washing liquid begins immediately before the arm 1a of the wiper blade 1c starts to wipe and ends when the arm 1a completes wiping over a range extending from a starting position to 55% to 75% the distance of one forward swing stroke as measured from the starting position (for example 50° to 70°, preferably 60°), during one forward swing (for example 90°) of the arm 1a (see the timing chart of FIG. 4). When viewed from the rotary shaft 1e, this range corresponds to a range extending from a position (a position at which a timer clock pulse rises) located immediately before the rotary shaft 1e starts rotating, to a position located after the rotary shaft 1e is rotated by the wiper motor 1d over an angle of 50° to 70° as measured from the starting position of rotation.

According to the example of the present method, the glass surface W of a vehicle can be washed using a required minimum amount of the washing liquid during every forward swing of the wiper blade 1c, and a washing liquid film, which remains on the glass surface W and which has a uniform thickness to not deteriorate a driver's view, can be wiped off almost completely during the subsequent backward swing of the wiper blade 1c.

A second example of the present invention will be described with reference to drawings.

Figure 5:
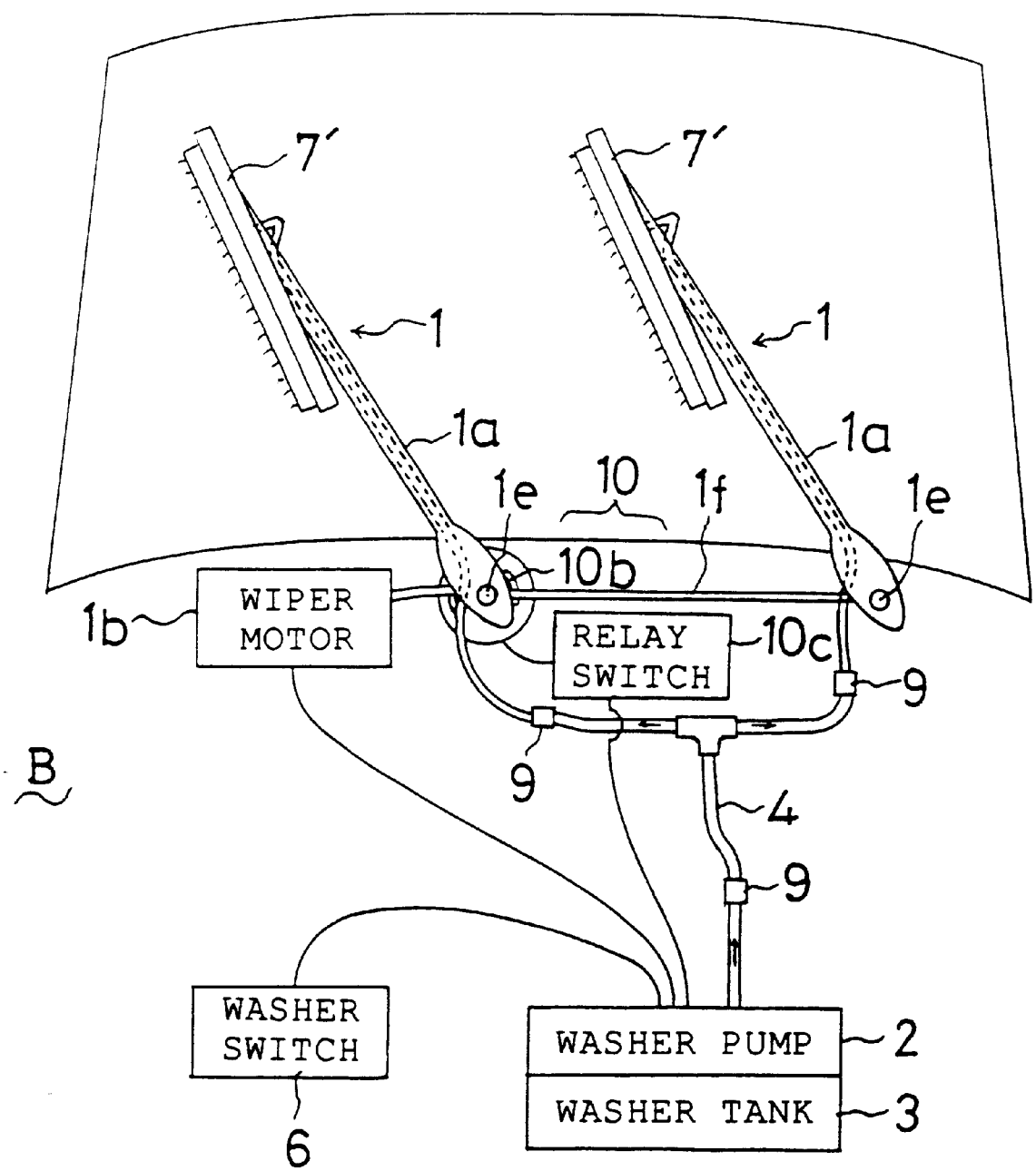
FIG. 5 is a explanatory view showing the main structure of a wiper-cooperative washing apparatus according to a second example of the present invention.
Figure 6:
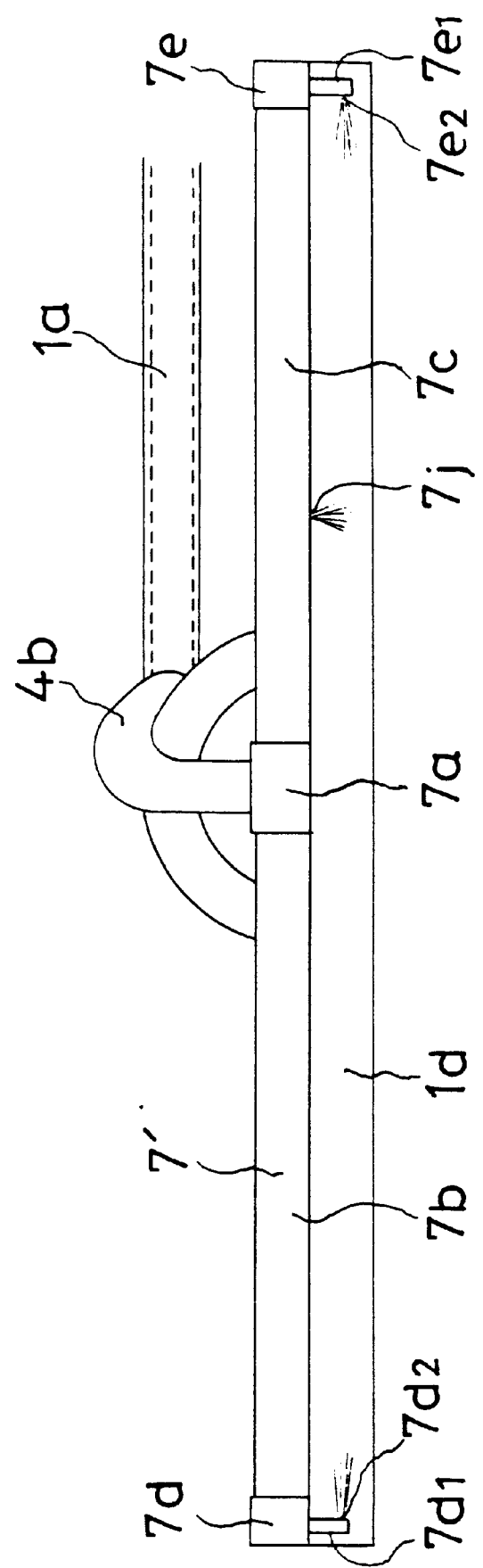
FIG. 6 is a enlarged front view showing a wiper blade nozzle pipe used in the second example.
Figure 7:
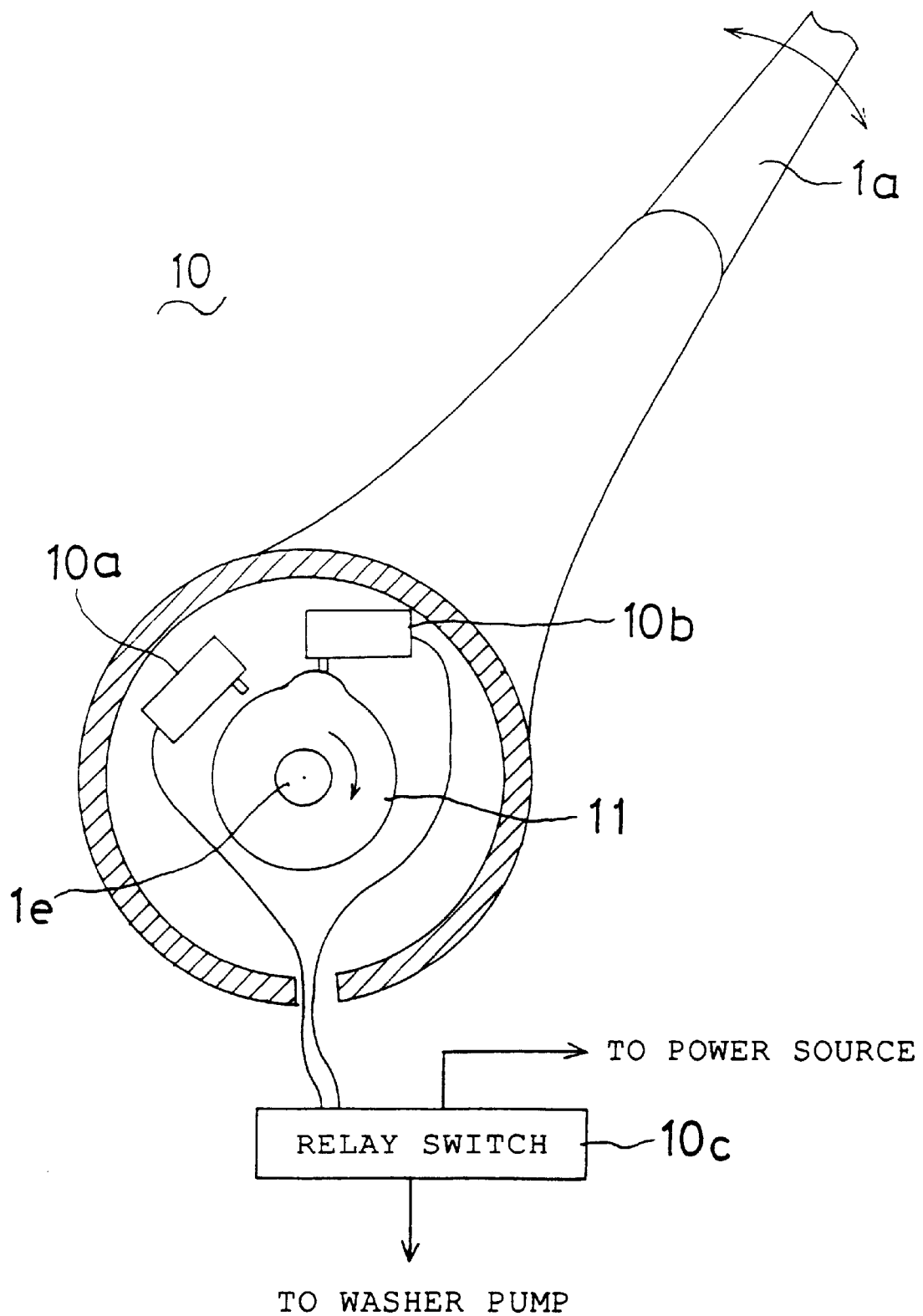
FIG. 7 is a schematic view showing the structure of a cam switch used in the second example.
Figure 8:
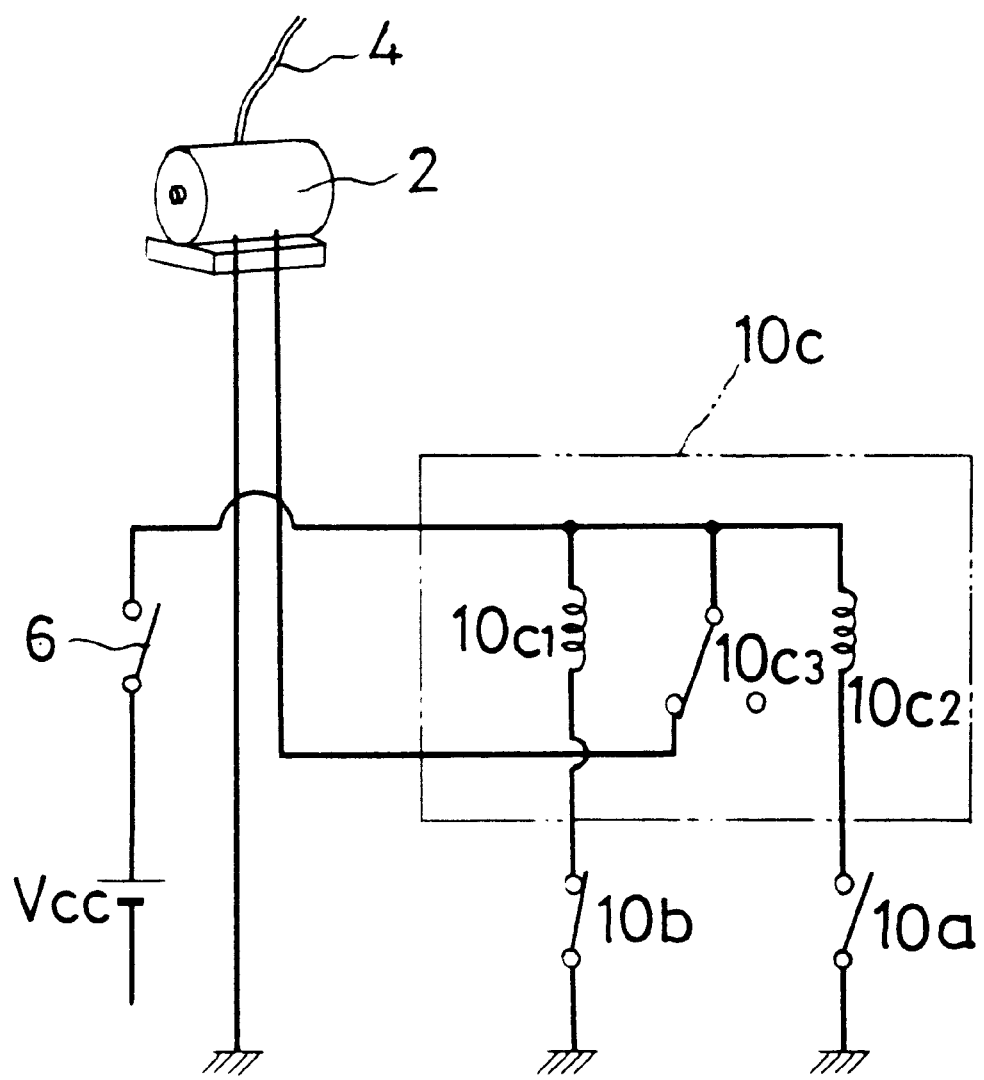
FIG. 8 is a circuit diagram of a relay switch disposed between the cam switch and a washer pump in the second example.

FIG. 5 shows the main structure of a wiper-cooperative washing apparatus B according to the second example. FIG. 6 shows an enlarged view of a wiper blade nozzle pipe in the second example. FIG. 7 shows the structure of a cam switch in the second example. FIG. 8 shows a circuit diagram of a relay switch in the second example.

The wiper-cooperative washing apparatus B according to the present example comprises primarily a wiper 1, a wiper motor 1b, a washer pump 2, a washer tank 3, a 3-way pipe 4, a washer switch 6, a wiper blade nozzle pipe 7', and a cam switch 10.

The same members as those of the first example as shown in FIG. 1 are denoted by common reference numerals, and their descriptions are omitted to avoid redundant description.

The wiper blade nozzle pipe 7' is formed by integrating together the wiper blade 1c and the attachment nozzle pipe 7, both shown in FIG. 3 to form a wiper blade assembly.

As shown in FIG. 7, the cam switch 10 comprises a cam 11, switches 10a and 10b, and a relay switch 10c.

The cam 11 is fixed to a rotary shaft 1e, which is driven by the wiper motor 1b to rotate an arm 1a of the wiper 1. The switches 10a and 10b are arranged so as to contact the cam 11 at a forward-swing starting position of the arm 1a and at a position corresponding to a rotational angle of 50° to 70° as measured form the starting position, respectively. Upon contact with the cam 11, the switches 10a and 10b output an ON signal.

The switches 10a and 10b may be known contactless switches. For example, when a magnet switch is used, a projection of the cam 11 may be of a permanent magnet.

As shown in FIG. 8, in the self-holding relay switch 10c, excitation coil 10c1 or 10c2 are energized upon reception of an ON signal from the switch 10a or 10b, so that an intermediate relay contact 10c3 is brought into the open and closed states, thereby performing ON/OFF control of the washer pump 2.

That is, when the washer switch 6 is turned on, the wiper motor 1b is switched such that the arm 1a of the wiper 1 swings forward and backward, for example, twice, and also the washer pump 2 is switched at such timing that the washing liquid is emitted over a range extending from the forward-swing starting position of the rotary shaft 1e to a position corresponding to a rotational angle of 50° to 70° of the rotary shaft 1e as measured from the starting position, during one forward swing of the arm 1a of the wiper 1.

According to the present example, as in the first example, the glass surface W of a vehicle can be washed using a required minimum amount of the washing liquid during every forward swing of the wiper 1, and a washing liquid film remaining uniformly on the glass surface W can be wiped off almost completely during the subsequent backward swing of the wiper 1.

The typical examples of the present invention have been described above, but the present invention is not limited thereto. The present invention may be embodied in modified forms so long as an object of the present invention is achieved and so long as an effect to be described later is provided.

Figure 9:
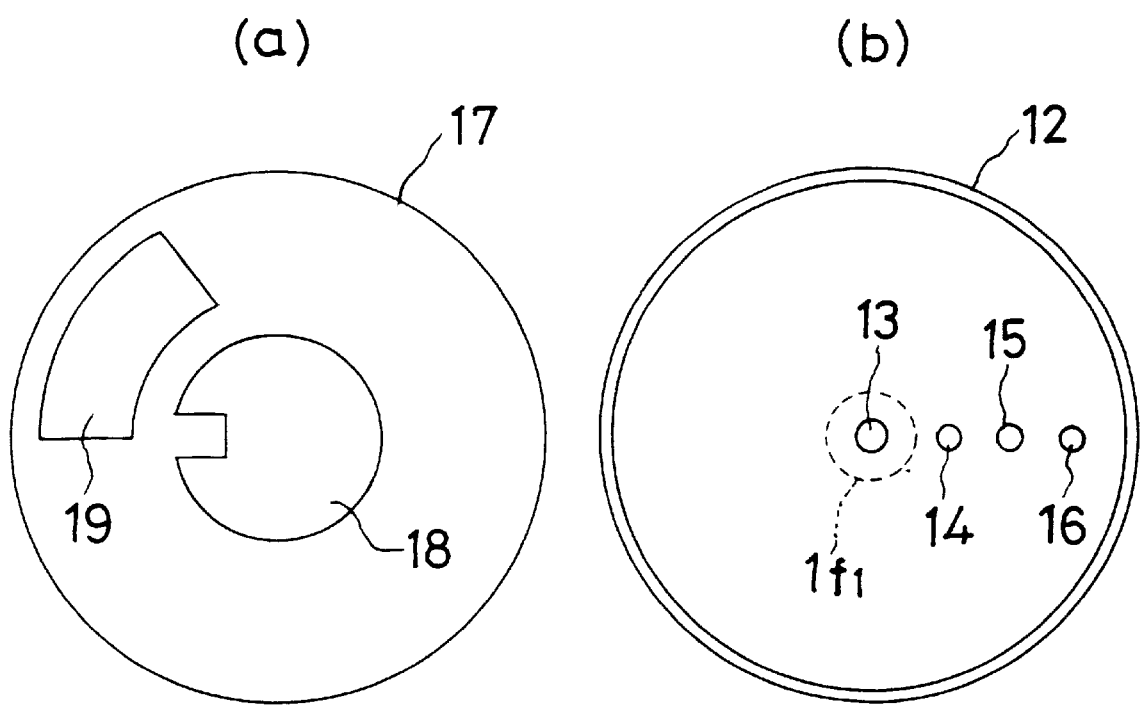
FIG. 9 is a exploded view showing a rotary disk and a stationary covering plate, which constitute a motor-integrated switch used in a wiper-cooperative washing apparatus according to another example of the present invention.

Particularly, control means includes a timer apparatus 5 and the cam switch 10, but they may be replaced by a motor-integrated switch having the following structure. As shown in FIG. 9, the motor-integrated switch includes a rotary disk 12 which is rotated together with a rotary shaft 1f1 by the wiper motor 1b, and a stationary covering plate 17. Brushes 13 to 16 are arranged on the rotary disk 12 in a radial direction thereof such that they are spaced from each other, while metal plates 18 and 19 are attached to the stationary covering plate 17. As the brushes 13 to 16 contact the corresponding metal plates 18 and 19, the operation of the arm 1a and the washer pump 2 is switched from ON to OFF, and vice versa.

In FIG. 9, the metal plate 18 contacts the brushes 13 and 14 to establish one forward-backward swing of the arm 1a. The metal plate 19 contacts the brushes 15 and 16 to establish an emission timing of the washer pump 2.

Figure 10:
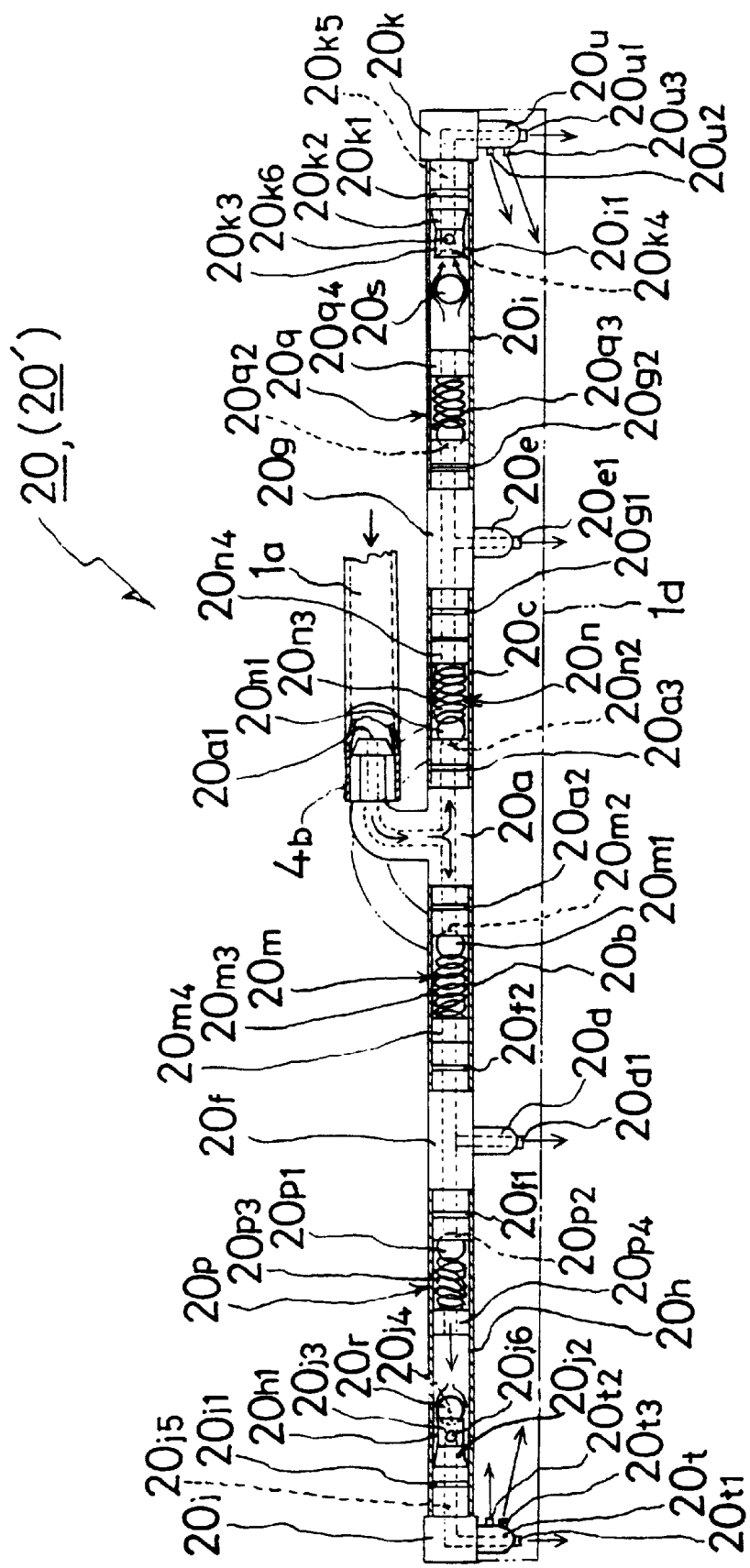
FIG. 10 is a partially cut away front view showing an attachment nozzle pipe or a wiper blade nozzle pipe used in a third or fourth example of the present invention.
Figure 11:
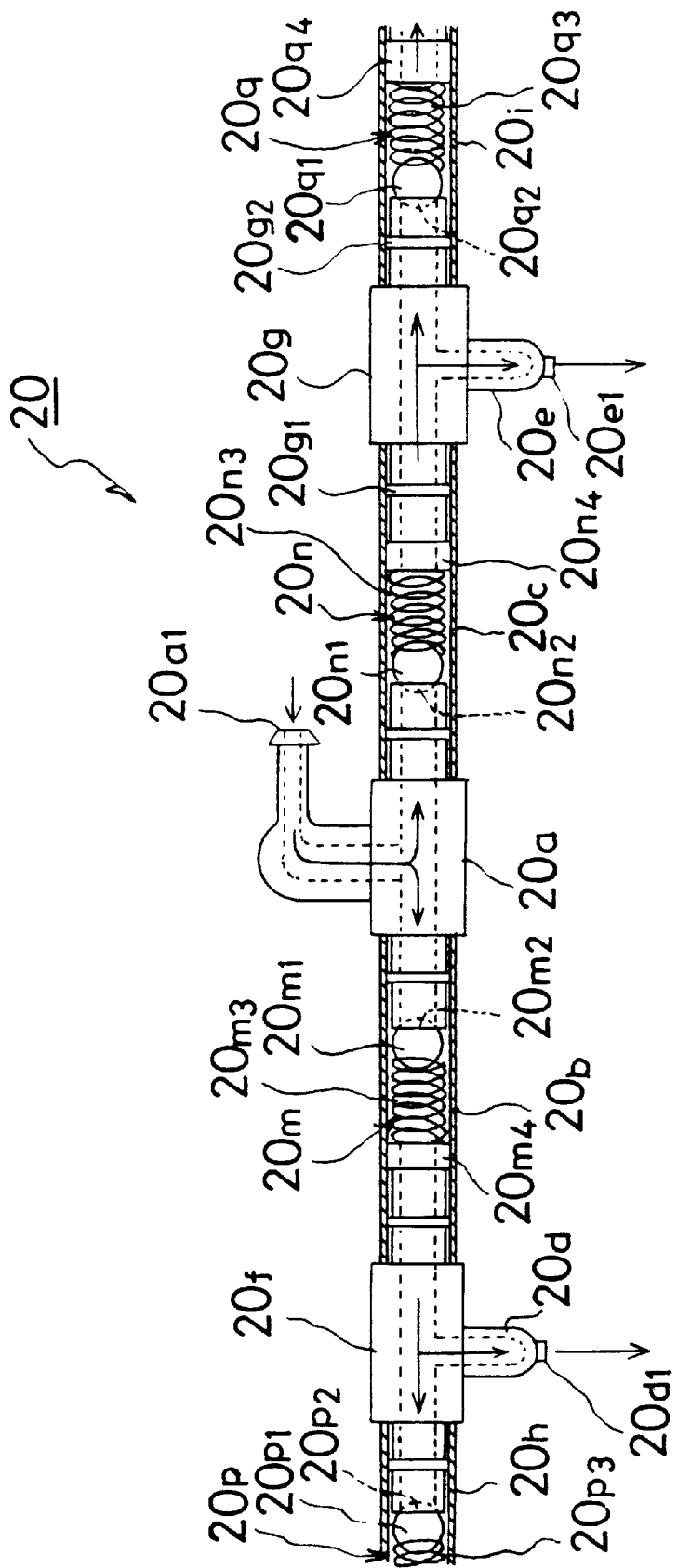
FIG. 11 is a enlarged longitudinal cross-sectional view showing essential portions of the attachment nozzle pipe or the wiper blade nozzle pipe of FIG. 10.
Figure 12:
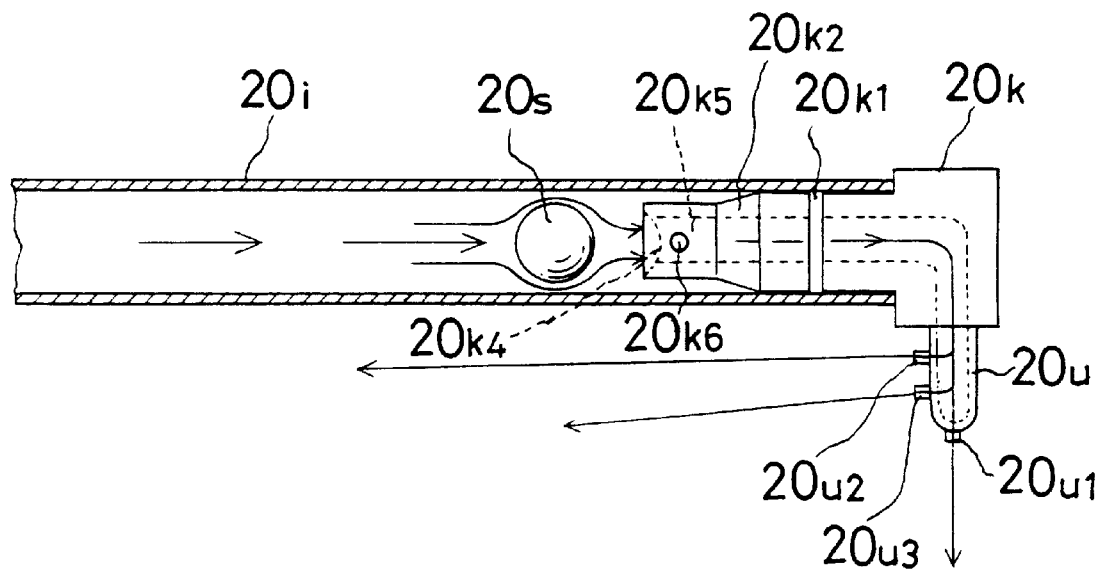
FIG. 12 is a view illustrating the initial behavior, when a washing liquid is emitted, of a ball relative to a right-hand (left-hand) endmost nozzle in the nozzle pipe of FIG. 10.
Figure 13:
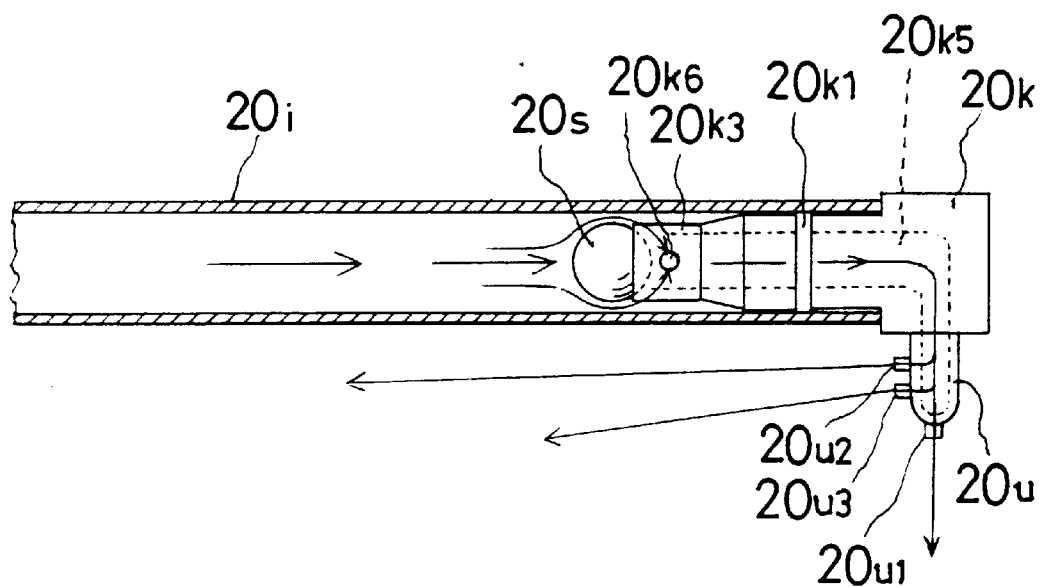
FIG. 13 is a view illustrating the steady-state behavior, when a washing liquid is emitted, of a ball relative to a right-hand (left-hand) endmost nozzle in the nozzle pipe of FIG. 10.
Figure 14:
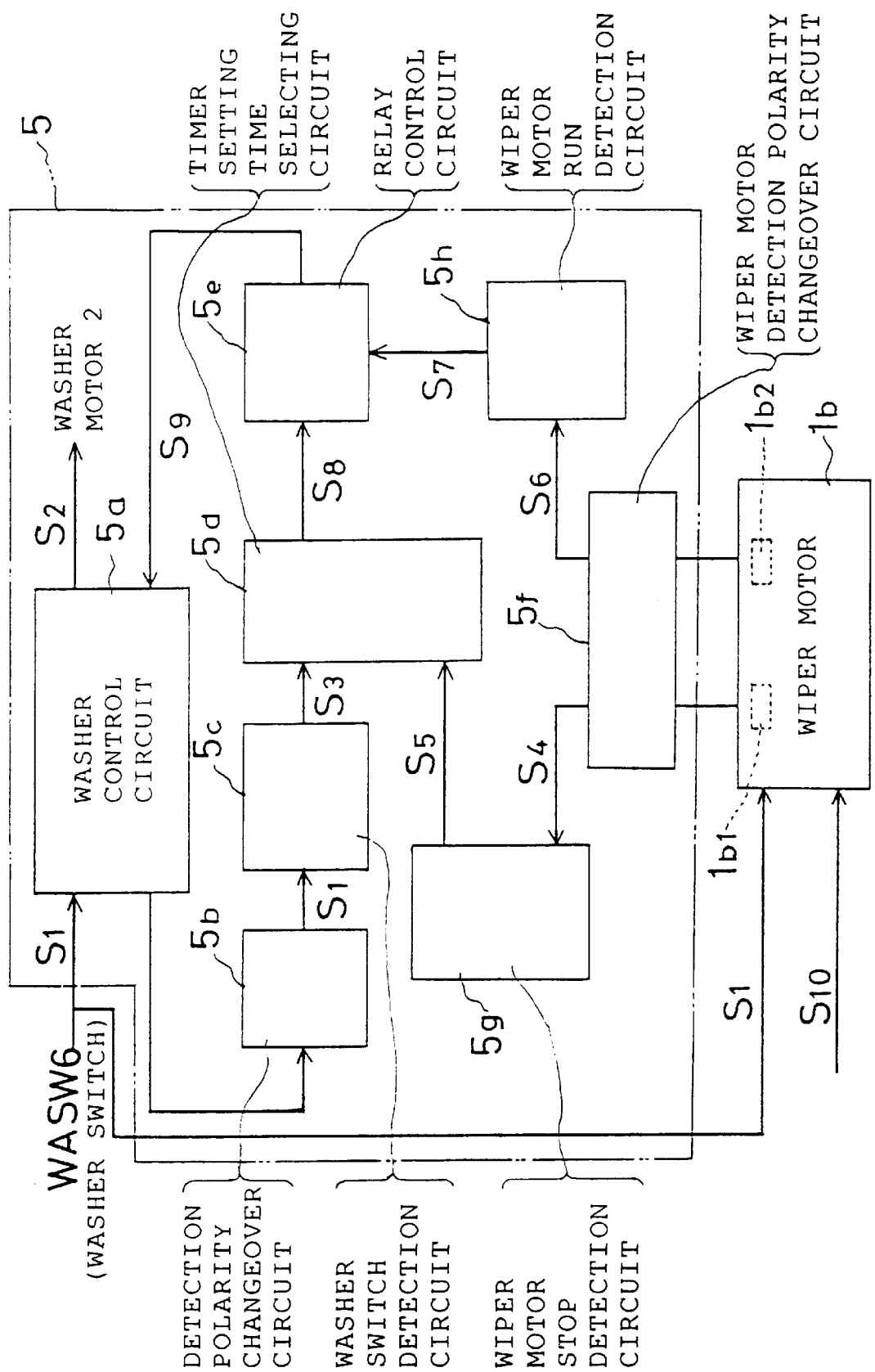
FIG. 14 is a block diagram of a timer apparatus used in the third example of the present invention.

FIG. 10 shows a partial longitudinal cross-section of an attachment nozzle pipe of a wiper-cooperative washing apparatus according to a third example of the present invention. FIG. 11 is a partial longitudinal cross-section showing essential portions of the attachment nozzle pipe. FIGS. 12 and 13 show views illustrating the behavior of a ball. FIG. 14 shows a block diagram illustrating a control circuit used as control means for performing control using a timer apparatus.

The present example is similar in structure to the first example shown in FIGS. 1 and 3 except for an attachment nozzle pipe. The same members as those of the first example are denoted by common reference numerals, and their descriptions are omitted to avoid redundant description.

An attachment nozzle pipe 20 comprises the following elements: central 3-way joint pipe 20a; left-hand and right-hand central wing pipes 20b and 20c attached respectively to left-hand and right-hand ends of the 3-way joint pipe 20a; intermediate joint pipes 20f and 20g which are attached respectively to the left-hand and right-hand ends of the left-hand and right-hand central wing pipes 20b and 20c and which have perpendicularly projecting beaks 20d and 20e, respectively; left-hand and right-hand end wing pipes 20h and 20i attached to the intermediate joint pipes 20f and 20g, respectively; left-hand and right-hand endmost nozzles 20j and 20k which are attached respectively to the left-hand and right-hand ends of the left-hand and right-hand end wing pipes 20h and 20i and which are made, for example, of a heat insulating engineering plastic; left-hand and right-hand central check vales 20m and 20n provided within the left-hand and right-hand central wing pipes 20b and 20c, respectively; left-hand and right-hand intermediate check vales 20p and 20q provided within the left-hand and right-hand end wing pipes 20h and 20i, respectively; and left-hand and right-hand stainless steel balls 20r and 20s which are contained within the left-hand and right-hand end wing pipes 20h and 20i, respectively, in a manner movable along the axial direction of the pipes 20h and 20i and which have a diameter somewhat smaller than the inner diameter of the pipes 20h and 20i.

In FIG. 10, reference numerals 20a2, 20a3, 20f1, 20f2, 20g1, 20g2, 20j1, and 20k1 denote O-rings.

Each branch pipe 4b of the 3-way pipe 4 is run along and behind the wiper arm 1a, and an end of the branch pipe 4b is connected to a horizontally oriented opening 20a1 which is located at the upper portion of the central 3-way joint.

The beaks 20d and 20e projecting respectively from the left-hand and right-hand intermediate joint pipes 20f and 20g have at their tip one nozzle port 20d1 and one nozzle port 20e1, respectively, or two nozzle openings formed in a forked manner.

The left-hand and right-hand central check valves 20m and 20n and the left-hand and right-hand intermediate check valves 20p and 20q comprise stainless steel ball valves 20m1, 20n1, 20p1 and 20q1, valve seats 20m2, 20n2, 20p2 and 20q2, compression springs 20m3, 20n3, 20p3 and 20q3, and support tubes 20m4, 20n4, 20p4 and 20q4, respectively. The valve seats 20m2 and 20n2 are formed respectively at the left-hand and right-hand ends of the central 3-way joint pipe 20a. The valve seat 20p2 is formed at the left-hand end of the left-hand intermediate joint pipe 20f. The valve seat 20q2 is formed at the right-hand end of the right-hand intermediate joint pipe 20g. The valve seats 20m2, 20n2, 20p2 and 20q2 are formed into a spherical concavily so as to be freely closed by the ball valves 20m1, 20n1, 20p1 and 20q1, respectively.

The left-hand (right-hand) endmost nozzle 20j (20k) has the following structure. A head 20j3 (20k3) is formed at the interior end portion of the nozzle 20j (20k) via a tapered shoulder portion 20j2 (20k2), and a circumferential clearance 20h1 (20i1) is formed between the inner surface of the left-hand (right-hand) end wing pipe (20h) and the head 20j3 (20k3). A beak 20t (20u) projecting perpendicularly to the longitudinal direction of the wiper blade 1d has a nozzle opening t1 (u1) located at the tip of the beak 20t (20u) so as to emit the washing liquid perpendicularly to the longitudinal direction of the wiper blade 1d. The beak 20t (20u) also has two nozzle openings 20t2 and 20t3 (20u2 and 20u3) arranged in two levels on the side wall of the beak 20t (20u) so as to emit the washing liquid in the longitudinal direction of the wiper blade 1d. A ball seat 20j4 (20k4) is formed at the end of the head 20j3 (20k3) such that it has a spherical concavily so as to be freely closed by the ball 20r (20s). A small hole 20j6 (20k6) having a diameter smaller than that of a nozzle bore 20j5 (20k5) is formed in the side portion of the head 20j3 (20k3) in a manner communicating with the nozzle bore 20j5 (20k5).

As shown in FIG. 14, the timer apparatus 5 comprises the following interrelated elements: a washer control circuit 5a, a detection polarity changeover circuit 5b, a washer switch signal detection circuit 5c, a timer setting time selection circuit 5d, a relay control circuit 5e, a wiper motor detection polarity changeover circuit 5f, a wiper motor stop detection circuit 5g, and a wiper motor run detection circuit 5h.

The washer control circuit 5a outputs a start signal S2 to the washer motor 2 upon reception of an ON signal S1 from the washer switch 6. The circuit 5a includes an automatic-reset type relay having a normally closed contact, which can be brought into the open and closed states.

The detection polarity changeover circuit 5b is adapted to manually select a control polarity in accordance with the washer motor 2 in use. This is because the control polarity of the washer motor 2 varies depending on the model of a vehicle. In a certain model, when the washer switch 6 is turned ON, the washer motor 2 is controlled on the positive (+) polarity side, while in a certain other model, on the negative (−) polarity side. Thus, either + or − detection must be selected depending on the model of the vehicle.

The washer switch signal detection circuit 5c outputs a detection signal S3 upon detection of an ON signal S1 of the washer switch 6 via the detection polarity changeover circuit 5b, by which an adequate control polarity has been selected.

The wiper motor detection polarity changeover circuit 5f is for manually selecting a control polarity in accordance with the wiper motor 1b in use. This is because each of a stop detection switch 1b1 and a run detection switch 1b2 of the wiper motor 1b outputs a signal of the positive (+) polarity in a certain case or a signal of the negative (−) polarity in a certain other case. Thus, either + or − detection must be manually selected depending on the wiper motor 1b when the apparatus of the present example is installed.

The wiper motor stop detection circuit 5g outputs a stop detection signal S5 upon detection of a stop signal S4 which indicates a stop of the wiper motor 1b and which is transmitted from the stop detection switch 1b1 such as a cam switch or a plate switch via the wiper motor detection polarity changeover circuit 5f, by which an adequate control polarity has been selected.

The wiper motor run detection circuit 5h outputs a run detection signal S7 upon detection of a run signal S7 which indicates a run of the wiper motor 1b and which is transmitted from the run detection switch 1b2 such as a cam switch or a plate switch via the wiper motor detection polarity changeover circuit 5f, by which an adequate control polarity has been selected.

The timer setting time selection circuit 5d begins to clock a previously selected period of time upon simultaneous reception, via an AND element, of both the detection signal S3 transmitted from the washer switch signal detection circuit 5c and the stop detection signal S5 which is transmitted from the wiper motor stop detection circuit 5g. Subsequently, when the preset period of time has elapsed, the circuit 5d outputs a relay ON signal S8. The AND element is used because an input of the stop detection signal S5 is a requisite for activation of the circuit 5d.

When the washer switch 6 is switched on, the unillustrated power source of the relay control circuit 5e is turned on so that the relay control circuit 5e becomes ready to operate. Input of the run detection signal S7 from the wiper motor run detection circuit 5h is a requisite for activation of the relay control circuit 5e. Thus, upon simultaneous reception, via an AND element, of both the relay ON signal S8 from the timer setting time selection circuit 5d and the run detection signal S7, the circuit 5e excites a relay coil or the like to which electrical power is supplied from the above-described power source. As a result, a washer motor stop signal S9 is output from the relay control circuit 5e, so that the contact of the relay provided within the washer control circuit 5a is magnetically attached to the open side. Consequently, the washer motor start control circuit is opened to thereby stop transmitting the start signal S2. As a result, the washer motor 2 stops running.

The wiper motor 1b, which is of an ordinary type, links to an ON-OFF operation of the washer switch 6. The wiper motor 1b starts running upon reception of the ON signal S1 from the washer switch 6. When it rains, the wiper motor 1b starts running upon reception of an ON signal S10 from an unillustrated wiper switch, independently of the washer pump 2.

When one detection switch can detect both stop and run of the wiper motor 1b, only either one of the stop detection switch 1b1 and the run detection switch 1b2 can be combined with only either one of the wiper motor stop detection circuit 5g and the wiper motor run detection circuit 5h.

Operation of the present example will be described with reference the above-described example in which the wiper motor stop detection switch 1b1 operates under the negative (−) polarity, and the timing chart for the case where the washer switch 6 is held ON. The description will be made with reference to FIGS. 11 to 15.

First, when the washer switch 6 is turned on while the wiper 1 is stopped at its lower dead point 0, the washer pump 2 is started via the washer control circuit 5a, thereby starting feeding of the washing liquid.

As shown in FIG. 11, the fed washing liquid enters the 3-way joint pipe 20a and branches off in two (left-hand and right-hand) directions. Then, the washing liquid reaches the left-hand and right-hand central check valves 20m and 20n. The supply pressure of the washing liquid causes the ball valves 20m1 and 20n1 to open against the force of the compression coil springs 20m3 and 20n3. Thus, the washing liquid passes through the thus-opened valve seats 20m2 and 20n2 and then flows through the left-hand and right-hand central check valves 20m and 20n. Subsequently, while the washing liquid is passing through the left-hand and right-hand intermediate joint pipes 20f and 20g, part of the washing liquid is emitted from the nozzle openings 20d1 and 20e1 of the beaks 20d and 20e, respectively, as shown by arrows.

After passing through the left-hand and right-hand intermediate joint pipes 20f and 20g, the washing liquid reaches the left-hand and right-hand intermediate check valves 20p and 20q. The supply pressure of the washing liquid causes the ball valves 20p1 and 20q1 to open against the force of the compression coil springs 20p3 and 20q3. Thus, the washing liquid passes through the thusopened valve seats 20p2 and 20q2 and then flows through the left-hand and right-hand intermediate check valves 20p and 20q. Subsequently, as shown in FIG. 12, while the washing liquid is pushing the left-hand and right-hand balls 20r and 20s toward the left-hand and right-hand endmost nozzles 20j and 20k, respectively, the washing liquid passes over the balls 20r and 20s and then passes through the nozzle bores 20j5 and 20k5. Thus, initially, the washing liquid is intensively emitted from the nozzle ports 20t1, 20t2, 20t3, 20u1, 20u2, and 20u3 in the directions of arrows as well as uniformly to the wiping side of the blade rubber 1a.

On the other hand, when the washer switch 6 shown in FIG. 14 is turned on, the ON signal S1 of the switch 6 is transmitted to the wiper motor 1b. Upon detection of the ON signal S1 by the wiper motor stop detection switch 1b1, the wiper motor 1b is started. Consequently, the wiper 1 housed in its housing portion begins to swing forward from its lower dead point 0 shown in FIG. 15. However, this point of time when the wiper 1 begins to swing forward is approximately 0.5 second after the washing liquid begins to emit from the attachment nozzle pipe 20.

At this point of time, as shown in FIG. 12, the left-hand and right-hand balls 20r and 20s are pressed against the ball seats 20j4 and 20k4, respectively, by the supply pressure of the washing liquid. Accordingly, the washing liquid is forced to pass in reduced quantity through the small holes 20j6 and 20k6 and then flows through the nozzle bores 20j5 and 20k5 of the left-hand and right-hand endmost nozzles 20j and 20k, respectively. Subsequently, the washing liquid is emitted from the nozzle openings 20t1 to 20t3 and 20u1 to 20u3 of the beaks 20t and 20u, respectively, in reduced quantity and as well as in the directions of arrows. Thus, the washing liquid continues being uniformly emitted toward the wiping side of the blade rubber 1d.

At the same time as the wiper 1 begins to swing forward, the timer setting time selection circuit 5d begins to clock the preset period of time (a time required for the arm 1a to travel from the starting point of its one forward-swing stroke to 55% to 75%, preferably 60% the forward-swing stroke). Subsequently, when the preset period of time has elapsed and thus the timer completes clocking, the control relay of the relay control circuit 5e is continuously energized so as to switch the closed contact of the relay in the washer control circuit 5a to the OFF (open) position, thereby stopping the washer motor 2.

As a result of stopping the washer motor 2, the compression coil springs 20m3, 20n3, 20p3 and 20q3 of the left-hand and right-hand central check valves 20m and 20n and the left-hand and right-hand intermediate check valves 20p and 20q, respectively, overcome the reduced supply pressure of the washing liquid and are elastically restored to their original shape. As a result, the ball valves 20m1, 20n1, 20p1, and 20q1 are pressed against the corresponding valve seats 20m2, 20n2, 20p2 and 20q2, thereby closing the valve seats. Thus, the supply flow of the washing liquid and the backflow of the washing liquid derived from the stopping of its supply are shut off. This reliably stops the emission of the washing liquid from the nozzle openings 20d1, 20e1, 20t1 to 20t3 and 20u1 to 20u3, and completely prevents subsequent ooze of the washing liquid from the nozzle openings, i.e. provides a complete shutoff of the washing liquid.

During the above operation, the wiper 1 continues a forward-swing stroke until it reaches its upper dead point. At the upper dead point, the wiper 1 switches its operation to a backward-swing stroke. Subsequently, the wiper 1 completes the backward-swing stroke. At that time, since the washer switch 6 is held switched ON, the washing cycle returns to its starting point. When the wiper motor stop detection switch 1b1 detects the stoppage of the wiper 1, the control relay coil of the relay control circuit 5e is de-energized. As result, the closed contact of the relay in the washer control circuit 5a is automatically returned to the closed position so as to restart the washer motor 2. The washing liquid is again fed to the attachment nozzle pipe 20. This cycle of operation is repeated so long as the washer switch 6 is switched on.

The above-described structure and operation of the circuit of the timer apparatus 5 is applicable to the above-mentioned first and second examples as well as the next fourth example.

A fourth example of the present invention will be described with reference to FIG. 10.

A wiper nozzle pipe 20' of the present example is constructed by replacing the wiper blade 1c shown in FIG. 3 with an attachment nozzle pipe 20 having the blade rubber 1d represented by the dash-and-two dots line in FIG. 10.

Other members are constructed and function in a manner similar to that of the above-described second or third example, and therefore their descriptions are omitted.

As has been described above, according to the present invention, a washing liquid is emitted from a wiper blade nozzle pipe or an attachment nozzle pipe. Thus, the glass surface of a vehicle can be washed irrelevant to crosswind or headwind.

Further, since an emission rate and an emission timing of the washing liquid are adequately adjusted, waste of the washing liquid can be prevented. Particularly, the washing liquid can be sufficiently wiped off by less operation of a wiper blade. According to our experiments, when the washing liquid was continuously emitted, a conventional wiper-cooperative washing apparatus used up one liter of the washing liquid in 53 seconds while an apparatus of the present invention used up one like in 350 seconds, which was 6 times longer than that of the conventional apparatus. Thus, the present invention is more economical, effective, and efficient.

Additionally, since by using a ball, the washing liquid is emitted at a larger rate at the initial stage of emission, and at a stabilized reduced rate at the subsequent stage of emission, the washing liquid can be uniformly applied onto a surface to be wiped. Accordingly, the glass surface can be washed without leaving spots thereon. Thus, excellent effects are provided, which include the following. Even when washing is performed while a vehicle is traveling, the applied washing liquid does not block a driver's view, thereby securing safety in driving.

I claim:

1. A method of washing a glass surface of a vehicle comprising the steps of:

swinging a wiper about a center of swinging rotation, the wiper including a blade in contact with the glass surface; and emitting a washing liquid from a plurality of positions arranged on the wiper along a longitudinal direction of the blade of the wiper, the washing liquid being emitted in a direction towards a forward-wiping side of the blade, the emitting being carried out at least over a range extending from a forward swing starting point at which a forward swing stroke is commenced to a predetermnined intermediate point located before a turning point where the forward swing stroke ends and a backward return swing is commenced.

2. A method according to claim 1, wherein the predetermined intermediate point is located at a distance from about 55% to about 75% of the distance of one forward swing stroke as measured from the forward swing starting point.

3. A method according to claim 1, wherein said step of emitting the washing liquid is initiated at a predetermined time before the wiper starts to swing forward.

4. A method according to claim 1, wherein the plurality of positions along the longitudinal direction of the blade includes at least both ends of the blade.

5. A method according to claim 1, wherein a rate of emission of the washing liquid at a particular one of the plurality of positions during said step of emitting the washing liquid increases with an increase in a distance of the particular one of said plurality of positions along the longitudinal direction of the blade as measured from the center of swinging rotation of the wiper.

6. A method according to claim 1, wherein the step of emitting the washing liquid is initiated at a start of the forward swing stroke.

* * * * *